Aug. 26, 1930.                P. STRANO                 1,773,762
                    WHEEL BRAKE FOR MOTOR VEHICLES
                    Filed Sept. 23, 1927      2 Sheets-Sheet 2
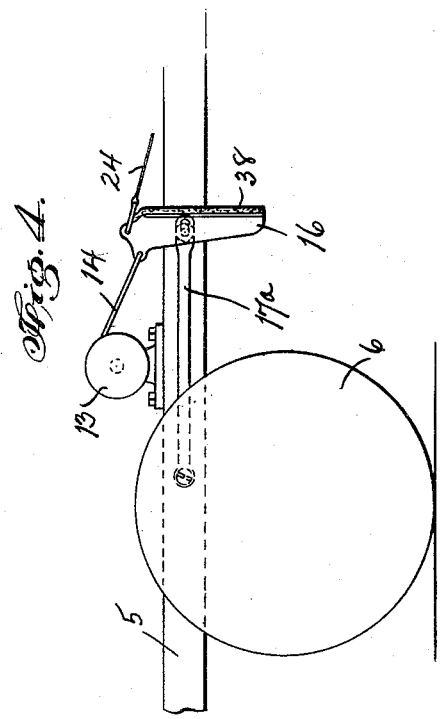
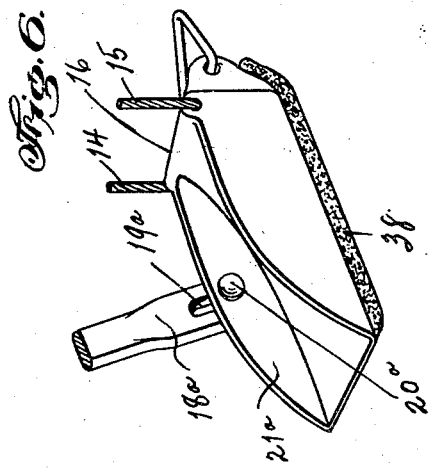
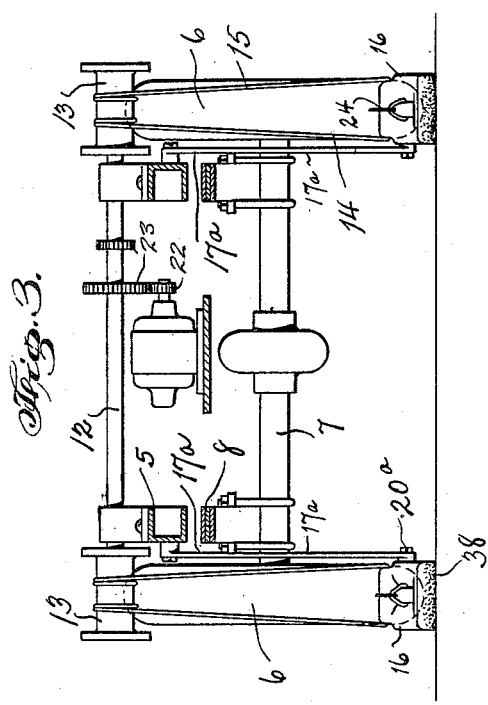
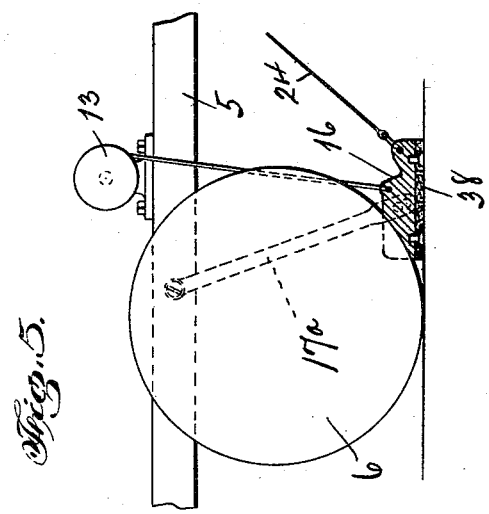
INVENTOR
Pasquale Strano
BY
Aaron L. Applebaum
ATTORNEY Patented Aug. 26, 1930

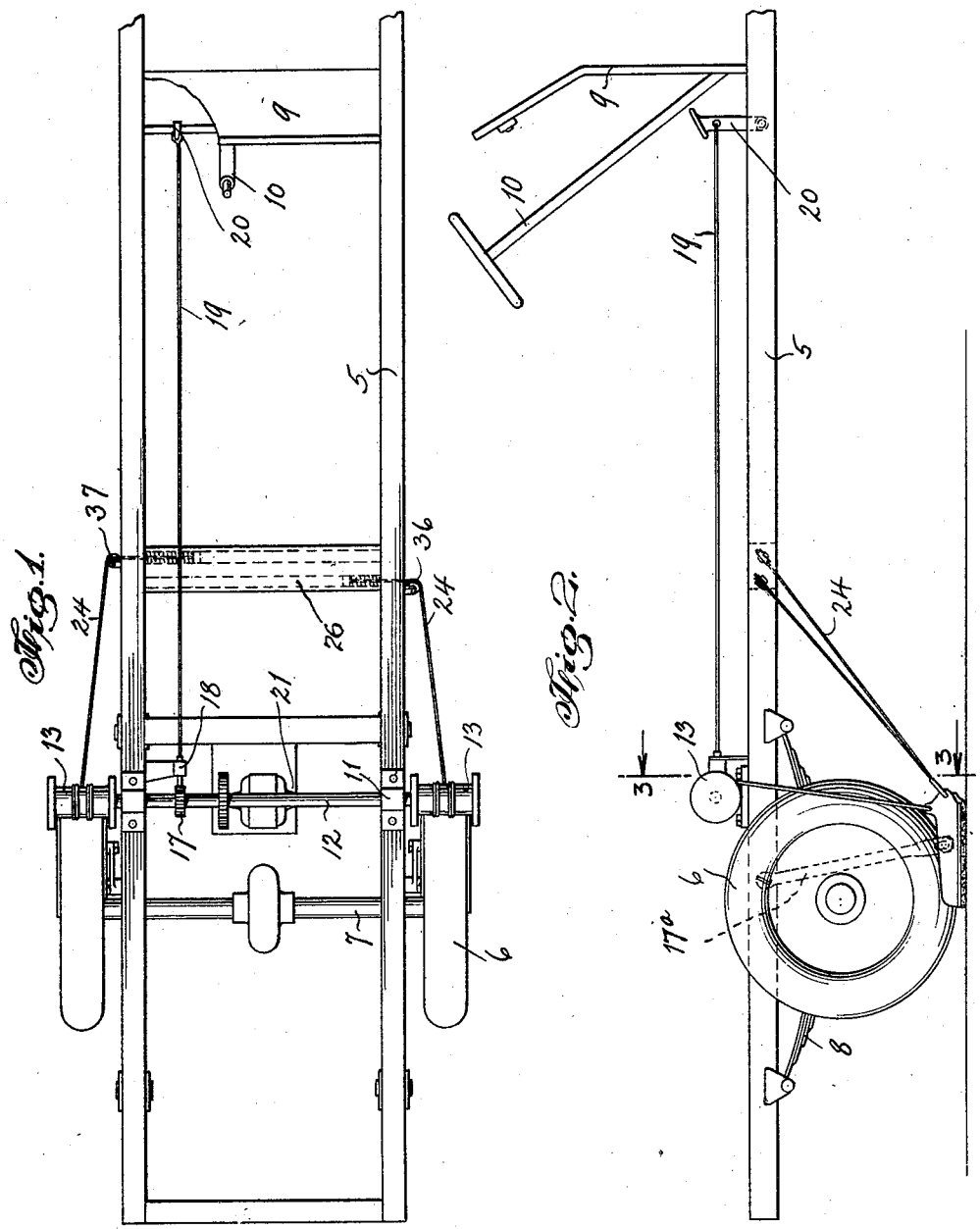

1,773,762

UNITED STATES PATENT OFFICE

PASQUALI STRANO, OF ELIZABETH, NEW JERSEY

WHEEL BRAKE FOR MOTOR VEHICLES

Application filed September 23, 1927. Serial No. 221,524.

This invention relates to wheel brakes for motor vehicles and particularly commercial trucks, having for its object to provide an improved mechanism to stop and prevent skidding of the drive wheels, being an improvement on my copending application, filed May 17th, 1927, Sr. No. 192,144.

One of the objects of my invention is to provide a braking mechanism for commercial trucks of the heavy type, wherein the ordinary friction brakes are insufficient to stop the vehicle by reason of the heavy loads being transported, particularly on a steep hill and in bad weather.

More specifically my invention consists in mounting a pair of trough shaped blocks or shoes supported from pivoted bars connected to the vehicle chassis and capable of being elevated to an inoperative position by means of a small motor or other device carried by the vehicle.

To enable others skilled in the art to which the invention pertains to more fully understand the above objects and others, which will become apparent as the description proceeds, reference is had to the accompanying drawing illustrating a preferred embodiment of the invention in which Fig. 1 is a top plan of a motor vehicle chassis showing the application of my invention.

Fig. 2 is a side view.

Fig. 3 is a section taken on the line 3—3 of Fig. 2.

Fig. 4 is a view showing the shoe in its elevated or inoperative position.

Fig. 5 is a view showing the position of a modified form of shoe in its operative position.

Fig. 6 is a perspective view showing the brake shoe and guide rod.

Referring now to the drawings wherein like reference characters designate corresponding parts throughout the several views, 5 designates a motor vehicle chassis having the usual rear driving wheels 6 mounted on a rear shaft 7 and equipped with the springs 8. A portion of the dash board 9 and front steering post 10 is also shown, the above being common to commercial trucks and motor vehicles generally.

Mounted on the chassis 5 in advance of the rear axle are suitable bearings 11 for a rotatable shaft 12, the ends of said shaft extending outside or beyond the sides of the chassis and equipped with pulleys 13 fastened or keyed to the shaft for rotation therewith. The shaft 12 and pulleys are located just in advance of the wheels 6 being entirely independent of the rear axle.

The respective pulleys are each adapted to receive one end of flexible lifting cables 14, 15, the opposite ends of said cable being connected to the front, side walls of a hollow block or shoe. Each of the shoes is connected by a guide bar $17^a$, the upper end thereof being pivotally connected for movement to the vehicle chassis and the lower end $18^a$ is slotted as at $19^a$ for the reception of a stud $20^a$ passing through the inner wall $21^a$ whereby the shoe is properly guided when raised and lowered relative to the vehicle wheels.

In the form shown by Figs. 1 and 2, the brake shoes are adapted to permit the vehicle wheels to ride up on the upper surface thereof to effect the braking action of the machine. In this form of the invention, it is necessary to reverse the movement of the machine in order to release the brake shoes so that they may be raised to their elevated and inoperative position. In Fig. 5 for instance, the brake shoes are lowered in advance of the vehicle wheels and are designed so as to prevent the wheels from riding up on the body of the shoe. In each instance, however, when the brakes or shoes are in their raised or elevated positions, the free rotation of the shaft will permit the brakes or shoes to fall by gravity whereby the wheels will be retarded to interrupt the travel of the machine, the guide bars preventing any lateral movement to the brake shoes which might tend to prevent them from being dropped directly in the path of the wheels.

To effect this operation, I have provided the shaft 12 with a gear 17 keyed thereto and a spring catch or lock 18 connected by a flexible cable 19 to a pivoted foot lever 20 at a point adjacent the steering post. When the said lock 18 is disengaged from the gear, the weight of the blocks or shoes is sufficient to cause the shaft to rotate whereby the blocks or shoes fall by gravity to the position shown.

To return the shoes or blocks to their elevated or raised and inoperative positions, any suitable means may be employed to rotate the shaft in the opposite direction, such as a small electric motor 21 having a gear 22 in mesh with a second gear 23 keyed to the said shaft 12. The said motor may be connected by suitable conductors, not shown, to a storage battery or other source of power and controlled from the dash board. The gears 22, 23 are in free meshing relation being of such size and construction as not to effect the lowering of the blocks or shoes.

In order to maintain the blocks or shoes in their operative position when lowered and to prevent the same from becoming detached, a cable 24 is connected to the front end of each of the blocks, said cable extending rearwardly through an opening in a spring housing 26 secured to the sides of the chassis.

In the actual use and operation of my auxiliary braking mechanism it will thus be seen that in their elevated or inoperative position, the flexable lifting cables are wound about the pulleys in which position the lock prevents the rotation of the shaft. When it is desired to drop or lower the shoes or blocks as upon approaching danger or when on a steep hill and the ordinary brakes do not hold, the operator may disengage the lock whereupon the weight of the shoes or blocks is sufficient to rotate the shaft and permit them to fall directly in front of the wheels. As the wheels ride up on the shoes or blocks, the flexible cables and resistance springs come into play with the result that the shoes or blocks are held tight and are prevented from disconnection or separation. In this position, it will be noted that the wheels become disengaged from the ground and become inoperative, thus stopping the machine. When the machine has been brought to a stop, the vehicle may be moved back slightly off the blocks or shoes and by operating the motor and rotating the shaft in the reverse direction, the shoes may be again elevated to their inoperative position. When thus raised, the foot lever is released and the lock engages the gear maintaining the blocks in their raised or elevated positions.

While I have shown and described my invention with some degree of particularity, I realize that various changes and alterations in the details of the construction may be resorted to. I therefore reserve the right to make such changes, modifications, and alterations in the details as may fairly fall within the scope of the subject matter now being claimed.

Having shown and described my invention what I claim as new and desire to secure by Letters Patent is:—

1. A wheel braking mechanism of the class described in combination with a motor vehicle chassis and driving wheels, comprising a shaft rotatably supported on the chassis, drums on the ends of said shaft extending beyond the sides of the chassis, flexible cables trained around said drums, a pair of recessed blocks attached to said cables, guide bars pivotally connected at their upper ends to the chassis, the lower ends of said bars being slotted and loosely connected to the inner wall of each of said blocks, locking means for releasing the shaft whereby the blocks may fall by gravity directly in the path of movement of the wheels to render the same inoperative, and resistance springs connected to the front of each of said blocks.

2. A wheel braking mechanism of the class described in combination with a motor vehicle chassis and driving wheels, comprising a shaft rotatably supported on the chassis, drums fixed on the ends of said shaft to extend laterally outward beyond the sides of the chassis, and flexible cables trained about the ends of said drums, a pair of blocks having raised side walls, said cables being engaged with said blocks, guide bars pivotally connected to the outer sides of the chassis, each of said bars having an elongated slot in the lower end thereof and loosely supporting said blocks, and locking means for releasing the shaft whereby the blocks may fall by gravity directly in the path of the wheels to render the same inoperative and means for raising said blocks out of engagement with said wheels.

3. A wheel braking mechanism of the class described in combination with a motor vehicle chassis and driving wheels, comprising a shaft rotatably supported on the chassis, a pair of hollow blocks, flexible cables trained about the ends of the shaft and connected to the sides of each of the blocks, guide bars pivotally connected at their upper ends to the outer sides of the chassis, said bars having slots in the lower ends thereof and studs extending through the inner walls of said blocks and slots for loosely supporting the blocks, a gear on the shaft, locking means cooperating with the gear to control the operation of the shaft, means for releasing said locking means whereby the blocks may fall by gravity to the ground directly in the path of movement of the wheels to render the same inoperative, and a motor including gearing for operating the shaft in the reverse direction to elevate the blocks.

4. A wheel braking mechanism of the class described in combination with a motor vehicle chassis and driving wheels comprising a freely rotatable shaft supported on the chassis in advance of the said wheels, pulleys on the ends of the shaft above and in advance of the wheels, flexible cables trained about the pulleys, hollow blocks connected to the ends of the cables, guide bars pivotally connected to the chassis and to the sides of the blocks, locking means for said shaft, means for releasing the locking means whereby the blocks may fall by gravity to the ground directly in the path of movement of the wheels, resistance springs and pulleys connecting the same to front of the blocks and power operating means for reversing the rotation of the motor shaft to elevate the said blocks.

5. A wheel braking mechanism of the class described in combination with a motor vehicle chassis and driving wheels, comprising a shaft freely rotatable on the chassis in advance of said wheels, pulleys on the ends of the shaft in advance of said wheels, flexible cables trained about the pulleys, trough shaped open blocks having friction surfaces on the bottom thereof, connected to said cables, guide bars pivotally connected at their upper ends to the chassis and at their lower ends to the inner sides of said blocks, means for locking and releasing the said shaft whereby said blocks may fall by gravity to the ground directly in the path of movement of the wheels, resistance springs and cables connecting said springs to the front of the blocks, and a motor and gearing for reversing the direction of rotation of said shaft to elevate the blocks.

In testimony whereof I affix my signature.

PASQUALI STRANO.